US008160081B2

(12) United States Patent  
Bae et al.

(10) Patent No.: US 8,160,081 B2
(45) Date of Patent: Apr. 17, 2012

(54) APPARATUS AND METHOD FOR SHARING CONTENT USING DIGITAL LIVING NETWORK ALLIANCE (DLNA) NETWORK AND COMPUTER-READABLE MEDIUM THEREOF

(75) Inventors: Young Kyu Bae, Suwon-si (KR); Ho Chul Shin, Suwon-si (KR); Chul Seung Kim, Seoul (KR); Hee Won Jung, Suwon-si (KR); Yun Je Oh, Yongin-si (KR); Joon Oo Kim, Suwon-si (KR)

(73) Assignee: Samsung Electronics Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 999 days.

(21) Appl. No.: 11/688,957

(22) Filed: Mar. 21, 2007

(65) Prior Publication Data
US 2007/0237115 A1  Oct. 11, 2007

(30) Foreign Application Priority Data
Apr. 10, 2006  (KR) .................. 10-2006-0032484

(51) Int. Cl.
*H04L 12/28* (2006.01)
*H04L 12/56* (2006.01)
*G06F 9/00* (2006.01)
*G06F 15/16* (2006.01)
*G06F 17/00* (2006.01)
*H04L 29/06* (2006.01)

(52) U.S. Cl. .................. 370/401; 726/15; 455/414.3
(58) Field of Classification Search .................. 370/331, 370/401; 726/15; 455/414.3
See application file for complete search history.

(56) References Cited

U.S. PATENT DOCUMENTS

| 2006/0018300 A1* | 1/2006 | Westberg et al. ............. 370/351 |
| 2006/0168656 A1* | 7/2006 | Stirbu ............................. 726/15 |
| 2006/0230142 A1* | 10/2006 | Yamamoto et al. ........... 709/224 |
| 2007/0211734 A1* | 9/2007 | Yang et al. .................... 370/401 |

FOREIGN PATENT DOCUMENTS

| KR | 2004-67885 | 7/2004 |
| KR | 2004-88847 | 10/2004 |
| KR | 10-662509 | 12/2006 |
| KR | 2007-18196 | 2/2007 |
| KR | 10-702516 | 3/2007 |
| WO | WO 2005/029282 | 3/2005 |

* cited by examiner

*Primary Examiner* — Nick Corsaro
*Assistant Examiner* — Munsoon Choo
(74) *Attorney, Agent, or Firm* — Cha & Reiter, LLC

(57) ABSTRACT

A method for sharing content using a Digital Living Network Alliance (DLNA) network is disclosed. The method includes the steps of creating a DLNA VPN (Virtual Private Network) between an inside-home DLNA network and at least one outside-home DLNA device, and delivering content from an inside-home DLNA device connected to the inside-home DLNA network to an outside-home DLNA device contained in the DLNA VPN in response to a request for content from the outside-home DLNA device. The method further allows continuous sharing of content, even if IP addresses of devices connected to the DLNA VPN are changed, by managing dynamic IP addresses of the devices connected to the DLNA VPN using an external network management server. Thus, the method allows outside-home DLNA devices to freely share content using a DLNA network. The method also allows various contents to be processed on a mobile terminal regardless of a storage space and processing capability of the mobile terminal.

22 Claims, 5 Drawing Sheets

APPARATUS AND METHOD FOR SHARING CONTENT USING DIGITAL LIVING NETWORK ALLIANCE (DLNA) NETWORK AND COMPUTER-READABLE MEDIUM THEREOF

CLAIM OF PRIORITY

This U.S. non-provisional application claims the benefit of the earlier filing date, under 35 U.S.C. §119, to that Korean Patent Application No. 2006-0032484, which was filed in the Korean Intellectual Property Office on Apr. 10, 2006, the contents of which are incorporated herein by reference.

BACKGROUND OF THE INVENTION

1. Field of the Invention

The present invention relates to a method for sharing content using a Digital Living Network Alliance (DLNA) network, and more particularly, to a method for sharing content stored in an inside-home DLNA device among outside-home DLNA devices.

2. Description of the Related Art

A wide variety of home electronics devices including information processing apparatuses, e.g., a personal computer (PC), telecommunication devices, e.g., a telephone, broadcasting devices, e.g., a TV, and audio and video (AV) devices are commonly used in homes. A home automation system has been proposed to automatically control devices and is currently being used in commercial applications.

In an initial phase, a home automation system individually controls home electronics devices using either a telephone or infrared ray technology. That is, the early-stage home automation did not achieve interoperability among different home electronics devices.

However, the recent advancement of telecommunication technology enables communication between different home electronics devices that create a network, under the command of a controller. The system for integrating and managing networked home electronics devices is referred to as a 'home network system'.

For example, a home network system allows networked home electronics devices (e.g. TV, washing machine, microwave oven, gas range, audio player, air conditioner, boiler, etc.), lighting, a gas valve and a front door to connect to a controller such as a home gateway or home server. The home network system also uses a specific terminal such as a remote control (hereinafter called a 'remote control').

Recently, standardization of a home network system is under way and a Digital Living Network Alliance (DLNA) has emerged as a new standard for controlling information-related home electronics devices (TVs, video tape recorders, digital cameras, audio systems, etc.) The DLNA, formerly known as Digital Home Working Group (DHWG) and established in June 2003, is a standardization body consisting of MicroSoft, IBM, HP, Intel, Sony, Matsushita, Samsung, and other firms.

The DLNA is dedicated to sharing the contents provided by different information-related home electronics devices such as TVs, video cassette recorders (VCRs), digital cameras and audio systems. For example, the DLNA enables networked devices within the home to share various digital media contents (e.g. photos, music, motion video, etc.) stored in personal devices such as mobile devices or PCs. Thus, the DLNA allows users to conveniently enjoy the digital media contents regardless of locations and sources within the home.

To this end, the DLNA mainly focuses on solving compatibility problem among home electronics devices through standardization of physical media, network transmission, media format, streaming protocol, Digital Rights Management (DRM) and the like based on a Universal Plug and Play (UPnP) technology.

More specifically, network connectivity in the DLNA is based on the Internet Protocol (IP). The IP is a well-known network communication protocol for devices operating on the Internet and enables transparent exchange of information on application programs that run in various media. This allows all DLNA devices to communicate with another device connected via the Internet. For example, a PC or set-top box (STB) containing a 'DLNA middleware' may transmit media content to a TV in the main room on a wireless basis through an 802.11 Access Point (AP) connected to an Ethernet cable.

A high-speed wired Ethernet (802.11u) and a wireless Ethernet (802.11a/b/g) may be used for a physical layer of the DLNA. The wired Ethernet is a well-known and proven stable communication protocol and the wireless Ethernet employs well-known Wireless-Fidelity (Wi-Fi) to allow for wireless home network communication Further, a technology for device discovery and control within a DLNA network is based on conventional UPnP AV and UPnP Architectures and enables a device to automatically configure networks, e.g., IP addresses, and to discover the presence of other devices on the network. The same applies to a technology of service discovery and control within the DLNA network.

DLNA devices may be categorized into Digital Media Server (DMS) and Digital Media Player (DMP) classes. A DMS performs the same function as a Multimedia Server Device (MSD) in the UPnP AV specification for providing media to devices. A DMP performs the same functions as a Media Renderer Control Point (MRCP) for selecting and controlling media for playback and a Media Renderer Device (MRD) for processing the selected media.

However, a DLNA system has been conventionally created only on an inside-home LAN to allow sharing of content between AV devices within the home. An outside-home DLNA device ia nor free to process content stored in inside-home AV devices. Thus, the conventional DLNA system does not allow free sharing of content between DLNA devices inside and outside the home.

SUMMARY OF THE INVENTION

The present invention provides a method for freely sharing content among inside- and outside-home Digital Living Network Alliance (DLNA) devices.

One aspect of the present invention is to provide a method for freely sharing content stored on an inside-home DLNA network with an authenticated outside-home DLNA device.

Another aspect of the present invention is to provide a method for continuously sharing content even if the network addresses of the authenticated inside- and outside-home DLNA devices are changed.

Another aspect of the present invention is to provide a content sharing method capable of processing various contents on a mobile terminal regardless of a storage space and processing capability of the mobile terminal.

In one embodiment, a method for sharing content using a DLNA network includes the steps of creating a DLNA VPN (Virtual Private Network) between an inside-home DLNA network and at least one outside-home DLNA device and delivering content from an inside-home DLNA device connected to the inside-home DLNA network to an outside-home DLNA device contained in the DLNA VPN in response to a request for content from the outside-home DLNA device.

Preferably, the step of creating the DLNA VPN comprises registering an account of a DLNA network for identifying the DLNA VPN with a network management server for managing the DLNA VPN, registering an inside-home DLNA gateway and at least one outside-home DLNA device that share information about the account and IP addresses thereof by matching the account information to the logged-in IP addresses of the gateway and at least one outside-home DLNA device, monitoring their IP (Internet Protocol) addresses in the gateway and the at least one outside-home DLNA device registered with the network management server, notifying the network management server of a change in IP address in a first device that detected the change after monitoring, updating the IP address of the first device that matches the account information to register a new IP address, delivering the new IP address of the first device to other devices having IP addresses that match the account information, and establishing a new VPN between the first device and other devices by using the changed IP address.

Preferably, the account includes identification (ID) information about the VPN and passwords used to authenticate devices that will be connected to the VPN.

Preferably, the step of registering the inside-home DLNA gateway and the at least one outside-home DLNA device comprises storing ID information and IP address associated with the inside-home DLNA gateway and ID information and IP address associated with the outside-home DLNA device that will be connected to the inside-home DLNA network via the VPN.

Preferably, the step of delivering the content comprises delivering a request for DLNA information, which is made by the outside DLNA device, through the VPN to a gateway for the inside-home DLNA network to a corresponding inside-home DLNA device in response to the request, the gateway receiving a response from the inside-home DLNA device through the inside-home DLNA network, and delivering the response from the gateway to the outside-home DLNA device through the VPN.

Preferably, the step of delivering the request further comprises awaking the corresponding inside-home DLNA device in the gateway when the inside-home DLNA device is in a sleep mode.

Preferably, the step of delivering the response comprises streaming content streamed through a DLNA network through the VPN when a request to process specific content is received as the DLNA information.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, exemplary embodiments of the present invention are described in detail with reference to the accompanying drawings. The same reference numbers are used for the same or like components in the accompanying drawings. Detailed explanations of well-known functions and configurations incorporated herein may be omitted for the sake of clarity and conciseness.

Figure 1:
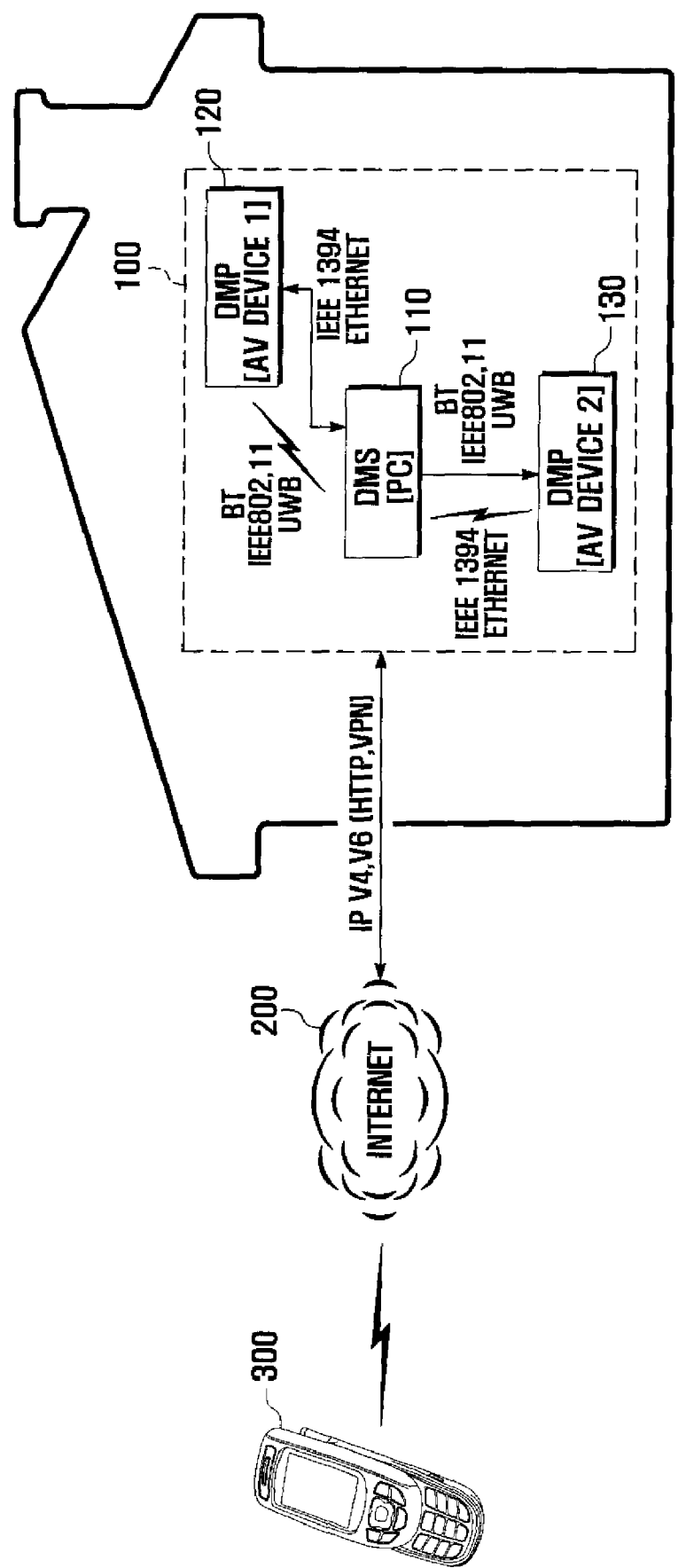
FIG. 1 illustrates a system configuration of a Digital Living Network Alliance (DLNA) network according to an exemplary embodiment of the present invention.

FIG. 1 illustrates an example of a system configuration of a Digital Living Network Alliance (DLNA) network according to an exemplary embodiment of the present invention. Referring to FIG. 1, the DLNA network system includes an inside-home DLNA network system 100 creating an inside-home DLNA network, and a mobile terminal 300 connected to the inside-home DLNA network system 100 via the Internet 200.

The inside-home DLNA network system 100 includes a digital media server (DMS) 110, e.g., a PC, providing multimedia content, and a plurality of digital media players (DMPs) 120 and 130, e.g., AV devices, processing digital media content provided by the DMS 110. The DMS 110 may communicate with the DMPs 120 and 130 through a wired network (e.g. IEEE 1394 or Ethernet) or wireless network (e.g. Bluetooth, IEEE 802.11 or Ultra Wide Band (UWB)). The DMS 110 may also act as a gateway on a home network. The DMPs 120 and 130 can also act as a control point (CP).

The inside-home DLNA network system 100 communicates with the Internet 200 using IPv4 and IPv6 (Hypertext Transfer Protocol (HTTP) and Virtual Private Network (VPN)). The mobile terminal 300 is connected to the inside-home DLNA network system 100 via the Internet 200.

The inside-home DLNA network system 100 enables a device to share digital content with other devices connected to the DLNA network system. For example, the DMP 120 or 130 may freely process AV content stored in the DMS 110. In particular, the feature of the present invention is that the mobile terminal 300 outside the home is allowed to freely share content stored in the inside-home DLNA network system 100. In order to achieve this, the mobile terminal 300 is connected to the inside-home DLNA network system 100 via a VPN to freely share the content stored in the inside-home DLNA network system 100. The VPN for connecting between inside- and outside-home DLNA devices is hereinafter referred to as a 'DLNA VPN'. When the mobile terminal 300 requests specific content stored in the DMS 110 through the DLNA VPN, the DMS 110 streams the content through the DLNA VPN, thus allowing a user of the mobile terminal 300 to freely use content stored in the DMS 110 in the same manner in which the user uses content stored in the mobile terminal 300.

Figure 2:
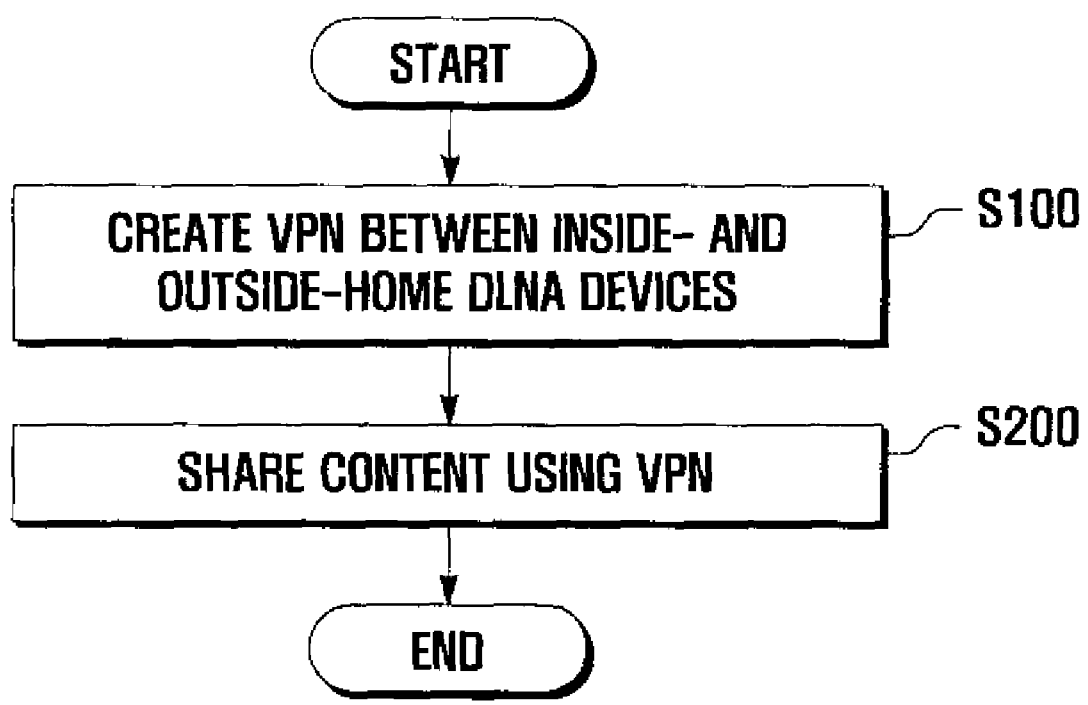
FIG. 2 is a schematic flowchart illustrating a method for sharing content using a DLNA network according to an exemplary embodiment of the present invention.

FIG. 2 is a schematic flowchart illustrating a method for sharing content using a DLNA network according to an exemplary embodiment of the present invention. Referring to FIG. 2, the method includes the steps of establishing a DLNA VPN between inside- and outside-home DLNA devices (S100) and sharing content using the DLNA VPN (S200).

More specifically, in the step S100, a DLNA VPN is created between an inside-home DLNA network and one or more outside-home DLNA devices. In the step S200, a device on the inside-home DLNA network sends content to an outside-home DLNA device contained in the DLNA VPN in response to a request for the content from the outside-home DLNA device, thus allowing the outside-home DLNA device to share content stored in the inside-home DLNA device. Steps S100 and S200 are described in more detail with reference to FIGS. 3 through 5.

Figure 3:
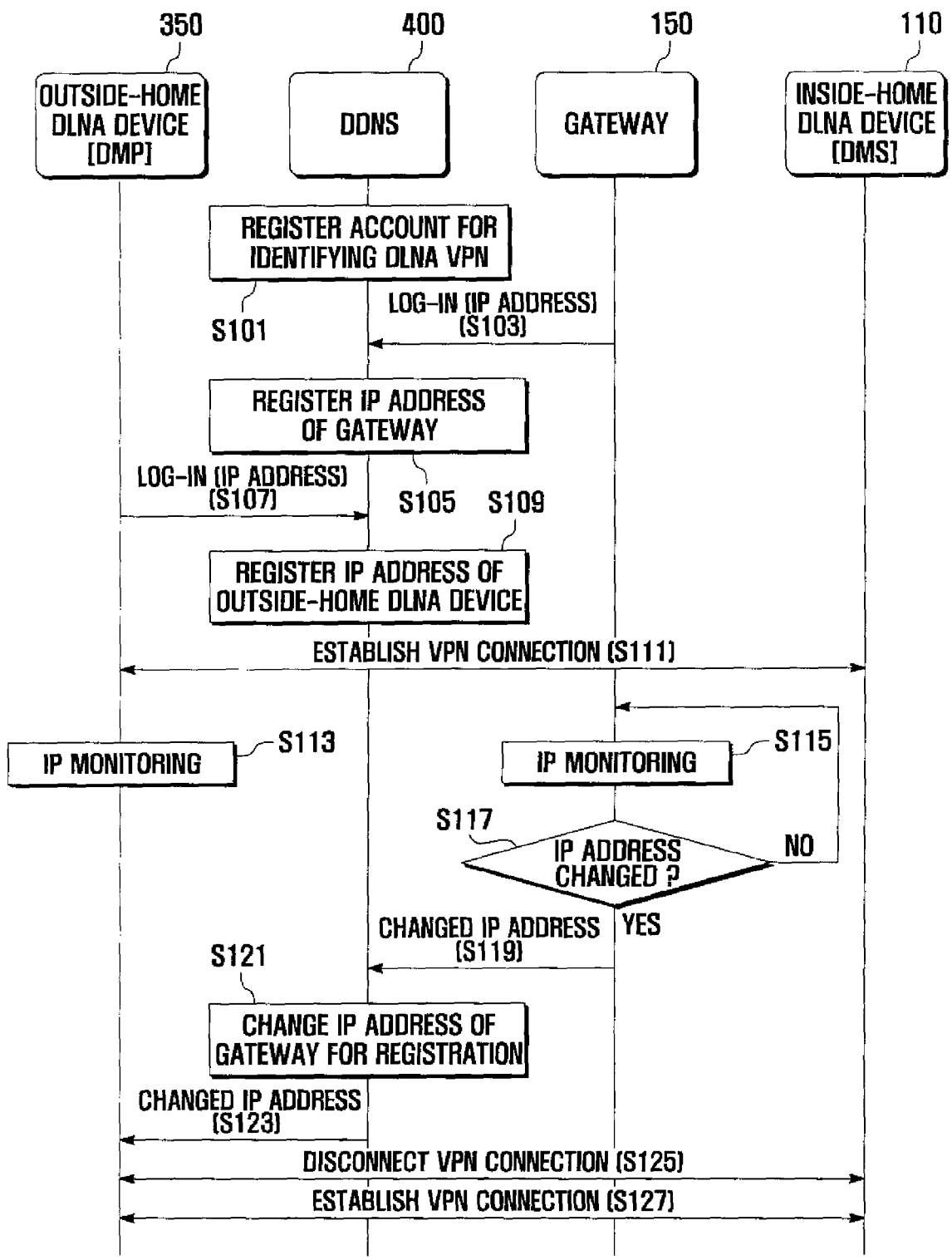
FIG. 3 is a flowchart illustrating a process of creating a network between inside- and outside-home DLNA devices according to an exemplary embodiment of the present invention.

FIG. 3 is a flowchart illustrating in more detail the step S100 of creating a DLNA VPN between inside- and outside-home DLNA devices according to an exemplary embodiment of the present invention. In the exemplary embodiment illustrated in FIG. 3, the DLNA VPN is created between an inside-home DLNA network containing a gateway 150 and an inside-home DLNA device 110 (e.g. DMS) and an outside-home DLNA device 350 (e.g. DMP) (see FIG. 1). The DLNA VPN connection is maintained to share DLNA content, even under an environment where a network address is changed, using a Dynamic Domain Name System (DDNS) 400. The DDNS a well-know system used on the Internet for dynamically managing domain names and IP addresses.

Referring to FIG. 3, the DDNS 400 first registers an account for identifying a DLNA VPN in step S101. Preferably, the DDNS 400 stores identification (ID) information and passwords associated with the DLNA VPN. Further, the DDNS 400 has a storage region for storing information about devices that will be connected to the DLNA VPN.

After successfully registering the account for identifying the DLNA VPN, the DDNS 400 registers devices that are connected to the DLNA VPN. To achieve this, the DDNS 400 matches account information stored in step S101 to IP addresses of the devices (e.g. inside-home DLNA gateway and one or more outside-home DLNA devices) that share the account information in response to logging-in of the devices.

More specifically, when the gateway 150 logs in using the account information registered in step S101 to send its own IP address in step S103, the DDNS 400 registers the IP address of the gateway 150 that matches account information in step S105. The same process applies for the outside-home DLNA device 350. That is, when the outside-home DLNA device 350 logs in using the registered account information to send its own IP address in step S107, the DDNS 400 registers the IP address of the outside-home DLNA device 350 that matches account information in step S109.

When the IP address of each device has been successfully registered, the devices are connected via a VPN in step S111, thus allowing transmission/reception of data between the devices using their IP addresses. That is, the IP address of each device registered with the DDNS 400 is used to encapsulate data for transmission to the desired destination.

In a network environment where an IP address is changing, the registered IP address for each device may be changed. Thus, when each device monitors its IP address to detect a change, it must notify the network (i.e. DDNS 400) of its new IP address.

Referring to FIG. 3, in steps S113 and S115, the outside-home DLNA device 350 and the gateway 150, respectively, connected via the VPN in step S111 continuously monitor whether their IP addresses change. When the gateway 150 detects a change in its IP address, i.e. when the IP address of the gateway 150 is changed in step S117, the gateway 150 reports its new address to the DDNS 400 in step S119.

In step S121, the DDNS 400 updates the IP address of the gateway 150 to register the new IP address delivered in the step S119. In step S123, the DDNS 400 also notifies the outside-home DLNA device 350 of the new IP address of the gateway 150. The outside-home DLNA device 350 that has received the changed IP address encapsulates data into data packets with the changed IP address for subsequent transmission to the gateway 150. When the change in IP address of the gateway 150 has been notified, the previous VPN connection is disconnected in step S125 and a new VPN connection is established by using the new IP address in step S127.

Figure 4:
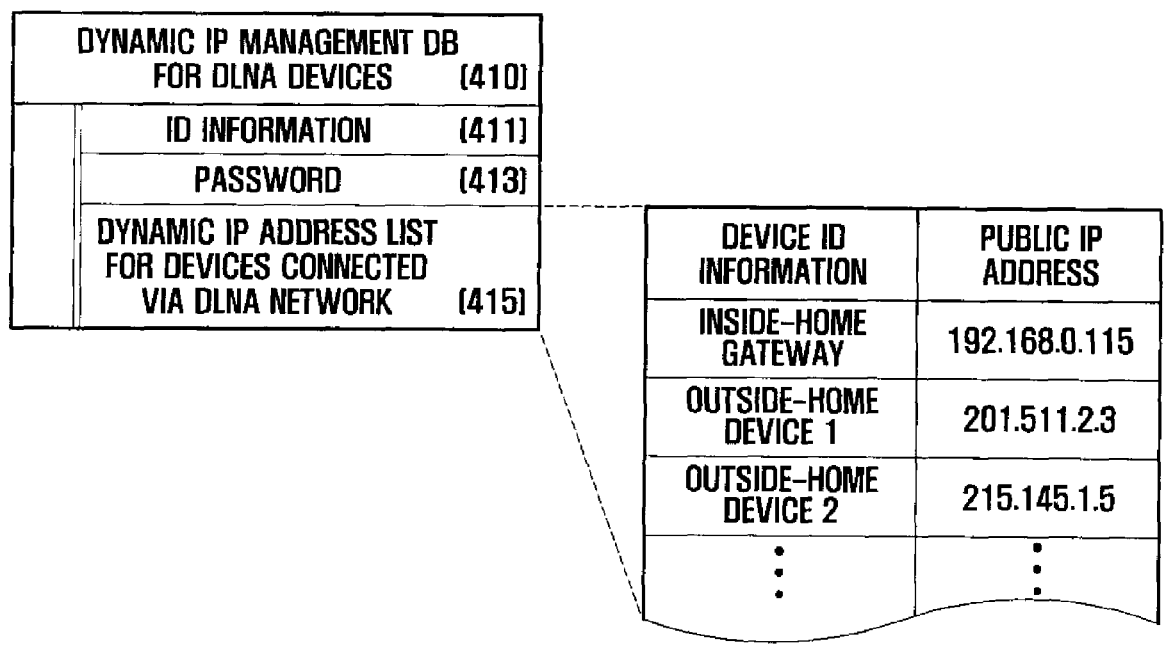
FIG. 4 illustrates an example of a field structure for a database for managing dynamic IP addresses of the inside- and outside-home DLNA devices in the process illustrated in FIG. 3.

FIG. 4 illustrates an example of a field structure for a database (DB) for managing dynamic IP addresses of the inside- and outside-home DLNA devices in the process illustrated in FIG. 3. That is, FIG. 4 illustrates an example of a data base containing information registered in the account registration (step S101) and device registration (steps S105 and S109). Preferably, the data base is stored in the DDNS 400 of FIG. 3.

Referring to FIG. 4, a dynamic IP address management data base 410 for DLNA devices includes a region 411 for storing ID information about an account registered to identify a DLNA VPN containing the DLNA devices, a region 413 for storing passwords being used to authenticate the devices that are connected to the DLNA VPN, and a list 415 of dynamic IP addresses of the devices connected to the DLNA VPN (hereinafter called a 'dynamic IP address list'). The dynamic IP address list 415 contains ID information and public IP addresses associated with the devices connected to the DLNA VPN. FIG. 4 illustrates an example in which devices including an inside-home gateway having a public IP address, for example, of '192.168.0.115', an outside-home device 1 having a public IP address, for example, of '201.511.2.3', and an outside-home device 2 having a public IP address, for example, of '215.145.1.5' are connected to the DLNA VPN.

The ID information and the passwords are created in step S101 of registering the account as illustrated in FIG. 3. Device ID information contained in the dynamic IP address list 415 is created in steps S105 and S109 of registering devices as illustrated in FIG. 3. The public IP addresses stored in the dynamic IP address list 415 can be changed as a result of self-monitoring performed by the devices.

Figure 5:
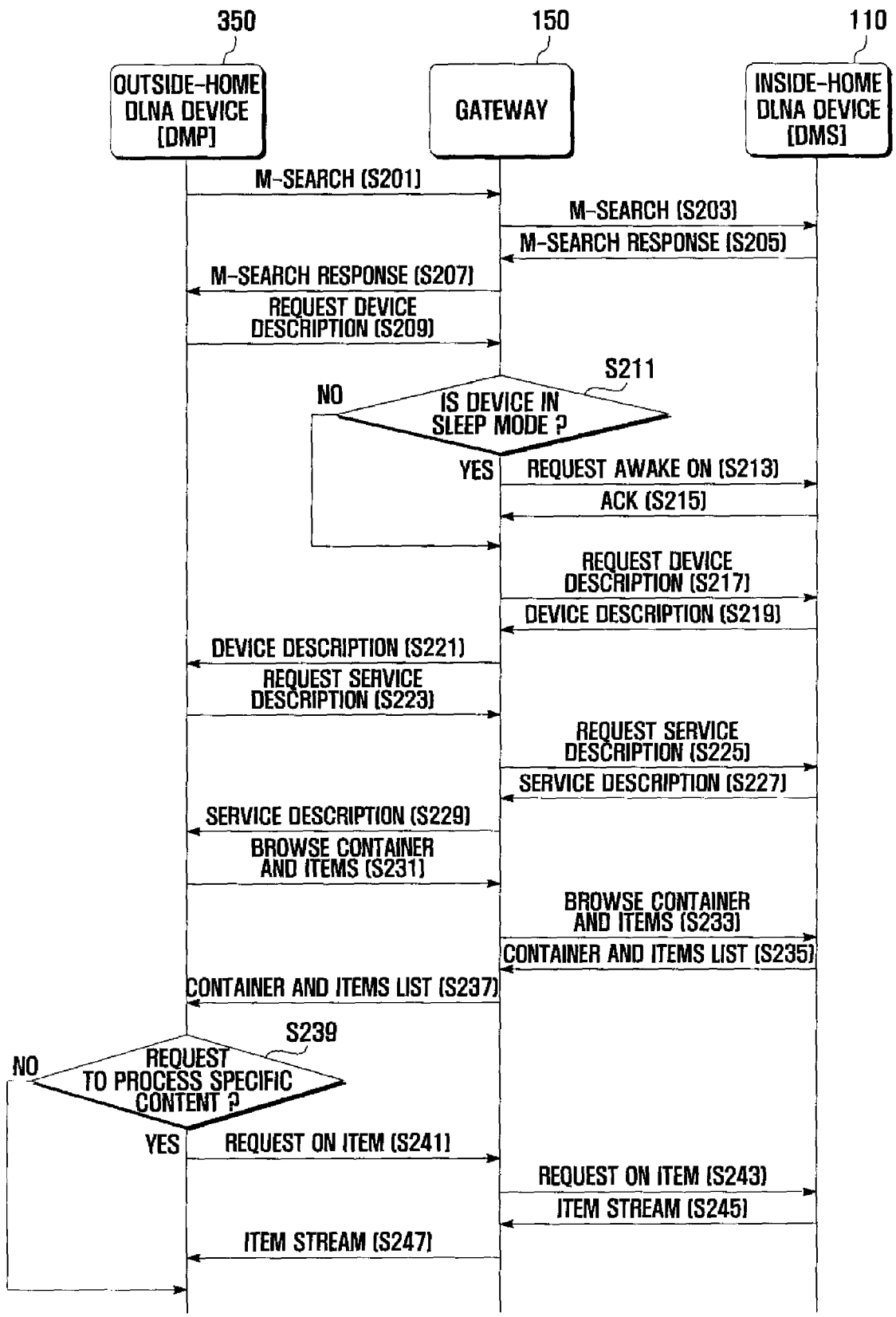
FIG. 5 is a flowchart illustrating a process of enabling an outside-home-DLNA device to use content stored in inside-home DLNA devices according to an exemplary embodiment of the present invention.

FIG. 5 is a flowchart illustrating in more detail step S200 of enabling an outside-home DLNA device 350 (e.g. DMP) to share content stored in an inside-home DLNA device 110 (e.g. DMP), which is illustrated in FIG. 2, according to an exemplary embodiment of the present invention. To achieve this connection, the outside-home DLNA device 350 requests DLNA information from the inside-home DLNA device 110 through gateway 150, and gateway 150, having received a response from the inside-home DLNA device 110 to the request, delivers the response to the outside-home DLNA device 350. In this case, the outside-home DLNA device 350 and the gateway 150 are connected via the DLNA VPN, while the gateway 150 and the inside-home DLNA device 110 are connected via a DLNA network.

Various DLNA information may be requested and a process for handling the requests is further illustrated in FIG. 5. Referring to FIG. 5, in step S201, the outside-home DLNA device 350 first sends a device search request to the gateway 150 through the DLNA VPN. That is, the outside-home DLNA device 350 requests a search for inside-home devices that are connected to the gateway 150, through the DLNA VPN. Then, in step S203, the gateway 150 delivers the device search request to the inside-home DLNA device 110. The above process is called an 'M-search', as defined in a DLNA protocol.

Upon receipt of a response message to the search request (e.g. M-search response) in step S205, the gateway 150 delivers the response message to the outside-home DLNA device 350 via the DLNA VPN in step S207.

In step S209, the outside-home DLNA device 350 that has received the response message requests device description for a specific device from the gateway 150. Then, in step S211, the gateway 150 determines the operation status of devices connected to the gateway 150, and in particular, whether the device of interest (e.g. the inside-home DLNA device 110) operates in a sleep mode.

In step S213, if the inside-home DLNA device 110 is in a sleep mode, the gateway 150 awakens the inside-home DLNA device 110. Upon receipt of a response message (ACK) from the inside-home DLNA device 110 in step S215, gateway 150 delivers the request for device description received in the step S209 to the inside-home DLNA device 110 in step S217. After receiving the device description from the inside-home DLNA device 110 in step S219, the gateway 150 delivers the device description to the outside-home DLNA device 350 in step S221.

Next, gateway 150 receives a request for service description from the outside-home DLNA device 350 that has received the device description in step S223 and delivers the request to the inside-home DLNA device 110 in step S225. Gateway 150 receives the service description from the inside-home DLNA device 110 in response thereto, in step S227, and delivers the service description to the outside-home DLNA device 350 in step S229.

When the outside-home DLNA device 350, that has received the service description, sends a request for content information (i.e. container and items) in step S231, gateway 150 delivers the request to the inside-home DLNA device 110 in step S233 and receives a response message (i.e. container & item list) from the inside-home DLNA device 110 in step S235. Gateway 150 delivers the response message to the outside-home DLNA device 350 in step S237. Finally, if the outside-home DLNA device 350 receives a request to process specific content from other devices in step S239, the outside-home DLNA device 350 sends a request to gateway 150 regarding the item corresponding to a specific content to process the content in step S241. The gateway 150 then delivers the request to the inside-home DLNA device 110 in step S243 and receives a stream associated with the item from the inside-home DLNA device 110 in step S245 before delivering the item to the outside-home DLNA device 350 in step 247. That is, the gateway 150 streams content through a DLNA network to the outside-home DLNA device 350 through a VPN.

As described in the above, the content sharing method according to the present invention allows inside-home and outside-home DLNA devices to freely share content by connecting an inside-home DLNA network and the outside-home DLNA device by VPN. In particular, only DLNA devices that share account information registered in advance can share content with each other. The method allows continuous sharing of content even if IP addresses of devices connected to the DLNA VPN are changed. The method also allows various content to be processed on a mobile terminal regardless of a storage space and processing capability of the mobile terminal located outside a home, because the mobile terminal may be content stored in the inside-home DLNA devices freely.

The above-described method according to the present invention can be realized as software and can be stored in a recording medium such as a CD ROM, an RAM, a floppy disk, a hard disk or a magneto-optical disk, so that a user can read such software by using a computer. Or the software may be downloaded over a network. When the software is downloaded into a memory accessible by a processor or computer chip, the processor or computer chip operates as an apparatus to execute the processing steps illustrated herein.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for sharing content using a DLNA (Digital Living Network Alliance) network, the method comprising the steps of:
    creating a DLNA VPN (Virtual Private Network) between an inside-home DLNA network containing a gateway and at least one outside-home DLNA device; and
    delivering content from an inside-home DLNA device connected to the inside-home DLNA network to an outside-home DLNA device contained in the DLNA VPN in response to a request for content from the outside-home DLNA device;
    wherein the outside-home DLNA device and the gateway are connected via the DLNA VPN, and the gateway and the inside-home DLNA device are connected via the inside-home DLNA network; and
wherein the gateway delivers requests between the inside-home DLNA device and the outside-home DLNA device using a registered IP address of each device;
    wherein creating a DLNA VPN further comprises the steps of:
    continuously self-monitoring respective IP addresses by the gateway and at least one outside-home DLNA device registered in the network management server;
    notifying the network management server of a change in the IP address by a first device;
    updating the IP address of the first device having an IP address that matches the account information to register a new IP address;
    delivering the new IP address of the first device to other devices having IP addresses that match the account information; and
    establishing a new VPN between the first device and other devices by using the changed IP address.

2. The method of claim 1, wherein creating a DLNA VPN comprises the steps of:
    registering, by a network management server, an account of a DLNA network for identifying the DLNA VPN for managing the DLNA VPN;
    registering, by the network management server, an inside-home DLNA gateway and at least one outside-home DLNA device that share information about the account; and
    registering, by the network management server, IP (Internet Protocol) addresses thereof by matching the account information to the IP addresses of the gateway and at least one outside-home DLNA device in response to logging-in of the gateway and at least one outside-home DLNA device.

3. The method of claim 2, wherein the account includes identification (ID) information about the VPN and passwords used to authenticate devices that are connected to the VPN.

4. The method of claim 2, wherein registering an inside-home DLNA gateway and at least one outside-home DLNA device comprises the steps of:
    storing ID information and IP address associated with the inside-home DLNA gateway and ID information and IP address associated with the outside-home DLNA device.

5. The method of claim 1, wherein delivering content comprises the steps of:
- delivering, by a gateway of the inside-home DLNA network, a request for DLNA information that is made by the outside-home DLNA device through the VPN to the inside-home DLNA device corresponding to the request;
- receiving, by the gateway, a response from the inside-home DLNA device through the inside-home DLNA network; and
- delivering, by the gateway, the response to the outside-home DLNA device through the VPN.

6. The method of claim 5, wherein delivering a request further comprises the step of:
- awakening the corresponding inside-home DLNA device by the gateway when the inside-home DLNA device is in a sleep mode.

7. The method of claim 5, wherein delivering the response comprises the step of:
- streaming content streamed through the inside-home DLNA network through the VPN when a request to process specific content is received as the request for DLNA information.

8. An apparatus for sharing content using a DLNA (Digital Living Network Alliance) network, the apparatus comprising:
- a processor in communication with a memory, the memory providing instruction to the processor to execute the steps of:
- creating a DLNA VPN (Virtual Private Network) between an inside-home DLNA network containing a gateway and at least one outside-home DLNA device; and
- delivering content from an inside-home DLNA device connected to the inside-home DLNA network to an outside-home DLNA device contained in the DLNA VPN in response to a request for content from the outside-home DLNA device;
- wherein the outside-home DLNA device and the gateway are connected via the DLNA VPN, and the gateway and the inside-home DLNA device are connected via the inside-home DLNA network; and
- wherein the gateway delivers requests between the inside-home DLNA device and the outside-home DLNA device using a registered IP address of each device;
- wherein the instruction for creating a DLNA VPN further comprises the steps of:
- continuously self-monitoring respective IP addresses by the gateway and at least one outside-home DLNA device registered in the network management server;
- notifying the network management server of a change in the IP address by a first device;
- updating the IP address of the first device having an IP address that matches the account information to register a new IP address;
- delivering the new IP address of the first device to other devices having IP addresses that match the account information; and
- establishing a new VPN between the first device and other devices by using the changed IP address.

9. The apparatus of claim 8, wherein the instruction for creating a DLNA VPN comprises the steps of:
- registering, by a network management server, an account of a DLNA network for identifying the DLNA VPN for managing the DLNA VPN;
- registering, by the network management server, an inside-home DLNA gateway and at least one outside-home DLNA device that share information about the account; and
- registering, by the network management server, IP (Internet Protocol) addresses thereof by matching the account information to the IP addresses of the gateway and at least one outside-home DLNA device in response to logging-in of the gateway and at least one outside-home DLNA device.

10. The apparatus of claim 9, wherein the account includes identification (ID) information about the VPN and passwords used to authenticate devices that are connected to the VPN.

11. The apparatus of claim 9, wherein the instruction for registering an inside-home DLNA gateway and at least one outside-home DLNA device comprises the steps of:
- storing ID information and IP address associated with the inside-home DLNA gateway and ID information and IP address associated with the outside-home DLNA device.

12. The apparatus of claim 8, wherein the instruction for delivering content comprises the steps of:
- delivering, by a gateway of the inside-home DLNA network, a request for DLNA information that is made by the outside-home DLNA device through the VPN to the inside-home DLNA device corresponding to the request;
- receiving, by the gateway, a response from the inside-home DLNA device through the inside-home DLNA network; and
- delivering, by the gateway, the response to the outside-home DLNA device through the VPN.

13. The apparatus of claim 12, wherein the instruction for delivering a request further comprises the step of:
- awakening the corresponding inside-home DLNA device by the gateway when the inside-home DLNA device is in a sleep mode.

14. The apparatus of claim 12, wherein the instruction for delivering the response comprises the step of:
- streaming content streamed through the inside-home DLNA network through the VPN when a request to process specific content is received as the request for DLNA information.

15. The apparatus of claim 8, wherein the instructions are stored in the memory.

16. A non-transitory computer-readable medium providing instructions for sharing content using a DLNA (Digital Living Network Alliance) network, the instructions causing a processor to execute the steps of:
- creating a DLNA VPN (Virtual Private Network) between an inside-home DLNA network containing a gateway and at least one outside-home DLNA device; and
- delivering content from an inside-home DLNA device connected to the inside-home DLNA network to an outside-home DLNA device contained in the DLNA VPN in response to a request for content from the outside-home DLNA device;
- wherein the outside-home DLNA device and the gateway are connected via the DLNA VPN, and the gateway and the inside-home DLNA device are connected via the inside-home DLNA network;
- wherein the gateway delivers requests between the inside-home DLNA device and the outside-home DLNA device using a registered IP address of each device;
- wherein the instruction for creating a DLNA VPN further comprises the steps of:

self-monitoring respective IP addresses by the gateway and at least one outside-home DLNA device registered in the network management server;

notifying the network management server of a change in the IP address by a first device;

updating the IP address of the first device having an IP address that matches the account information to register a new IP address;

delivering the new IP address of the first device to other devices having IP addresses that match the account information;

establishing a new VPN between the first device mad other devices by using the changed IP address.

17. The computer-readable medium of claim 16, wherein the instructions for creating a DLNA VPN comprises the steps of:
    registering, by a network management server, an account of a DLNA network for identifying the DLNA VPN for managing the DLNA VPN;
    registering, by the network management server, an inside-home DLNA gateway and at least one outside-home DLNA device that share information about the account; and
    registering, by the network management server, IP (Internet Protocol) addresses thereof by matching the account information to the IP addresses of the gateway and at least one outside-home DLNA device in response to logging-in of the gateway and at least one outside-home DLNA device.

18. The computer-readable medium of claim 17, wherein the account includes identification (ID) information about the VPN and passwords used to authenticate devices that are connected to the VPN.

19. The computer-readable medium of claim 17, wherein the instructions for registering an inside-home DLNA gateway and at least one outside-home DLNA device comprises the steps of:
    storing ID information and IP address associated with the inside-home DLNA gateway and ID information and IP address associated with the outside-home DLNA device.

20. The computer-readable medium of claim 16, wherein the instruction for delivering content comprises the steps of:
    delivering, by a gateway of the inside-home DLNA network, a request for DLNA information that is made by the outside-home DLNA device through the VPN to the inside-home DLNA device corresponding to the request;
    receiving, by the gateway, a response from the inside-home DLNA device through the inside-home DLNA network; and
    delivering, by the gateway, the response to the outside-home DLNA device through the VPN.

21. The computer-readable medium of claim 20, wherein the instructions for delivering a request further comprises the step of:
    awakening the corresponding inside-home DLNA device by the gateway when the inside-home DLNA device is in a sleep mode.

22. The computer-readable medium of claim 20, wherein the instructions for delivering the response comprises the step of:
    streaming content streamed through the inside-home DLNA network through the VPN when a request to process specific content is received as the request for DLNA information.

* * * * *